United States Patent [19]
Saitoh et al.

[11] Patent Number: 4,633,115
[45] Date of Patent: Dec. 30, 1986

[54] APPARATUS FOR CONNECTING CONDUCTOR STRANDS WITH TRANSPOSITION IN ELECTRICAL ROTARY MACHINE

[75] Inventors: Toshio Saitoh; Noriyoshi Takahashi; Masaki Sato; Masatoshi Watanabe, all of Hitachi, Japan

[73] Assignee: Hitachi, Ltd., Tokyo, Japan

[21] Appl. No.: 709,140

[22] Filed: Mar. 7, 1985

[30] Foreign Application Priority Data

Mar. 9, 1984 [JP] Japan .................................. 59-43816

[51] Int. Cl.⁴ ............................................. H02K 3/14
[52] U.S. Cl. ....................................... 310/213; 310/71
[58] Field of Search ............... 310/213, 214, 179, 180, 310/184–189, 194, 254, 256, 260, 54, 64, 71; 174/33, 34; 336/187

[56] References Cited

U.S. PATENT DOCUMENTS

| | | | |
|---|---|---|---|
| 1,376,433 | 5/1921 | Hellmund | 310/213 |
| 1,643,178 | 9/1927 | Savage | 310/213 |
| 3,214,617 | 10/1965 | Tudge | 310/213 X |
| 3,521,101 | 7/1970 | Arora | 310/237 X |
| 4,080,543 | 3/1978 | Takahashi et al. | 336/187 X |
| 4,321,426 | 3/1982 | Schaeffer et al. | 310/213 X |
| 4,384,227 | 5/1983 | Kawai | 310/213 |
| 4,490,637 | 12/1984 | Griend | 310/237 |

*Primary Examiner*—Mark O. Budd
*Attorney, Agent, or Firm*—Antonelli, Terry & Wands

[57] ABSTRACT

An apparatus for connecting conductor strands with transposition in an electrical rotary machine is disclosed to include a plurality of electrically conductive connector rods respectively connected to ends of the individual strands of each conductor, and a plurality of electrically conductive plates arrayed in the axial direction of the conductive connector rods and adapted to mutually connect respective pairs of strands of the multiple strand conductors through the corresponding conductive rods while electrically insulating one strand pair from other strand pairs.

4 Claims, 17 Drawing Figures

APPARATUS FOR CONNECTING CONDUCTOR STRANDS WITH TRANSPOSITION IN ELECTRICAL ROTARY MACHINE

This invention relates to an apparatus for connecting conductor strands with transposition in an electrical rotary machine such as a turbine generator.

In a large capacity electrical rotary machine such as a turbine generator, a great number of axially extending winding slots are formed in an inner peripheral surface of a laminated stator core, and multiple-strand conductors constituting an armature winding are fitted in the slots and electrically connected together at their opposite ends projecting outwards from the winding slots.

When an AC current is passed through the multiple-strand conductors arranged as above, circumferential leakage fluxes are produced across the winding slots, thereby inducing electrical voltages in the respective parts of the strands of each conductor in the axial direction thereof. If the electrical voltages are greatly different from part to part, a large circulating current will flow through a pair of strands constituting a closed loop circuit, resulting in increasing an electrical loss and also the amount of heat generated in the conductor having the strands.

Accordingly, it is practice to transpose individual strands of each conductor in a suitable way to ensure that electrical voltages induced in the respective strands constituting one conductor are substantially equal to each other over the entire length of the conductor so that the flow of a circulating current is prevented.

In a single multiple-strand conductor, the respective strands are transposed by sequentially changing positions of the respective strands in the conductor. In the transposition, each strand is displaced in position as circularly rotating around the cross-sectional center of the conductor, and the degree of a transposition of the strand can be indicated by its rotation angle. For example, when each of individual strands constituting one conductor is transposed through all the initial strand positions where the strands are disposed in the conductor before it enters into a slot so as to return its initial position when the conductor exits the slot, this transposition is usually called a 360° transposition.

In an ordinary generator, all the strands of each armature conductor are mutually short-circuited at opposite ends of the conductor. Taking into consideration the fact that leakage flux develops at either end of the armature, positions of the individual strands at one end of the conductor are exactly reversed with respect to their positions at the opposite end of the conductor so that directions of voltages induced in both the ends of each strand are reversed to each other so as to cancel out the induced voltages, thereby reducing a loss caused in that strand.

Figure 1:
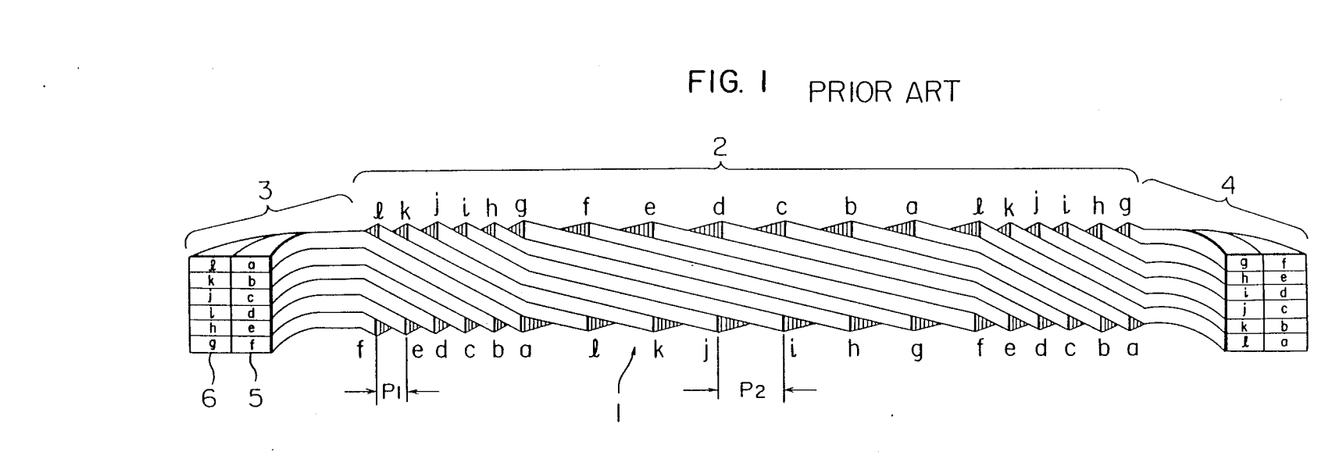
FIG. 1 is a front view showing a conventional transposed multiple-strand conductor.
Figure 2:
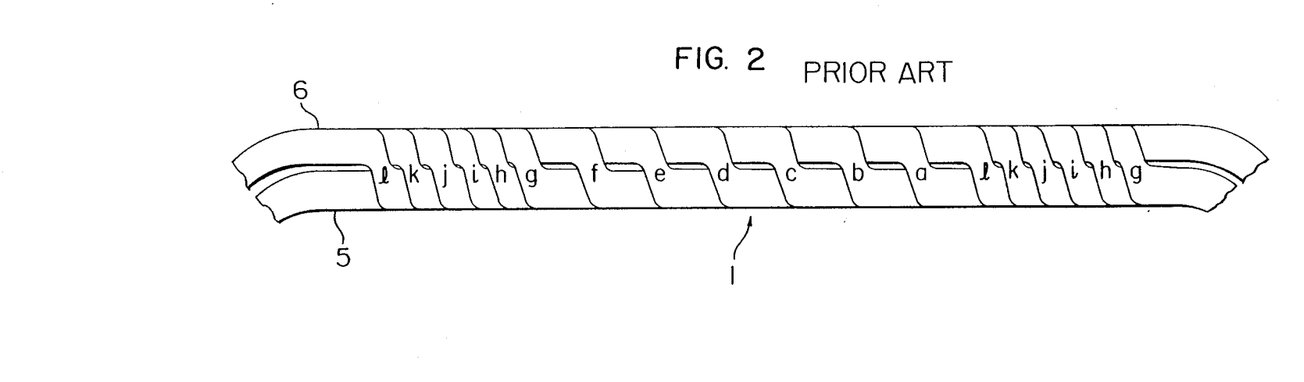
FIG. 2 is a plan view of the transposed conductor of FIG. 1.

Referring to FIGS. 1 and 2, the manner of a transposition will first be described. In these figures, an armature conductor 1 is exemplified which is arranged according to a generally known Roebel transposition in which the angle of transposition is 540° equivalent to one and half rotation.

The conductor 1 has an inner straight portion 2 composed of twisted strands which is fitted in a winding slot of an electrical rotary machine, and outer portions 3 and 4 extending from both ends of the inner portion 2 and projecting from opposite ends of the winding slot. Each of the outer portions 3 and 4 is curved in circumferential and radial directions. The conductor 1 is composed of twelve strands a to l which are arranged in two six-strand columns 5 and 6.

These strands are transposed in such a manner that the uppermost one of the strands of one column 6 is bent to be transposed onto the other column 5, while the lowermost one of the strands of the other column 5 is bent to be transposed beneath the column 6 and such transposition steps are repeated as shown in FIGS. 1 and 2, in which the transposed portions of the strands a to l are designated by symbols a to l, respectively. The inner conductor portion 2 has a transposition pitch $P_1$ at its end parts adjacent to its opposite ends and at its middle part, a transposition pitch $P_2$ which is about half the pitch $P_1$. By so selecting values of the pitches $P_1$ and $P_2$, inductances of the individual strands are made substantially equal to each other inside the slot.

With the strands subject to the above transposition, however, amounts of currents flowing through the strands cannot always be uniform. One of the reasons is that flux distributions at the opposite ends of the generator have an effect on the disturbance of uniformity. More specifically, a pair of strands a and l occupies an upper portion of the multiple-strand conductor at one end 3 thereof while it occupies a bottom portion at the other end 4. Since very complicated flux distributions occur at the opposite ends and interfere with the above strand pair taking different positions within the conductor, amounts of flux interlinking the strand pair at the opposite ends are not always equal to each other. As a result, a potential difference occurs across the paired strands and an amount of current corresponding to the difference between induced voltages at the opposite ends is generated.

In the conventional transposition as above, the strands are short-circuited at the opposite ends of the multiple-strand conductor with the result that the status of the transposition of strands cannot be changed. This makes it difficult to obtain uniform currents in the strands and in some cases, a large circulating current flows through the conductor to locally heat the same. In the worst case, insulating covers of the strands are damaged and a short-circuiting trouble is liable to occur between the strands.

Accordingly, it is an object of this invention to provide an apparatus for connecting conductor strands with transposition capable of reducing the circulating current to minimize the loss.

To accomplish the above object, according to this invention, a plurality of electrically conductive plates are provided each of which permits selective connection of respective pairs of strands at an end of a multiple-strand conductor, and the status of transposition of strands in an armature winding is adjustable by changing connections at the conductive plate in order to provide optimum transposition of the strands.

The invention will be explained more in detail in conjunction with the accompanying drawings, in which.

The invention will now be described by way of example with reference to the accompanying drawings.

In general, two multiple-strand conductors are fitted in each slot formed in a stator of a turbine generator, and one conductor close to a gap between the stator and a rotor will hereinafter be termed an upper conductor and the other conductor remote from the gap a lower conductor.

Figure 3:
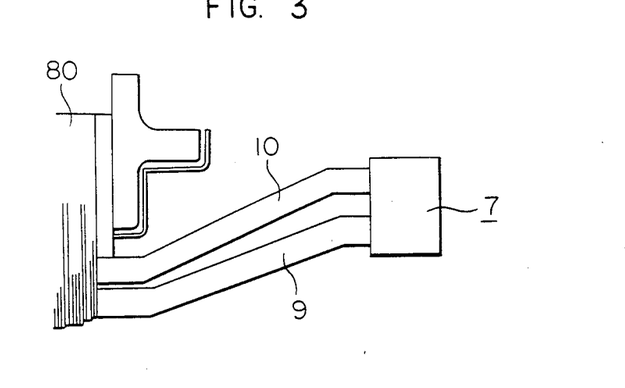
FIG. 3 is a schematical external view showing an arrangement in connection of the conductors using an apparatus of the invention.

Referring to FIG. 3, an apparatus 7 according to the invention is mounted to an end of a generator for connecting a pair of multiple-strand upper and lower conductors 9 and 10 with transposition of the strands. The upper and lower conductors 9 and 10 extend exteriorly of a stator core 80.

Figure 4:
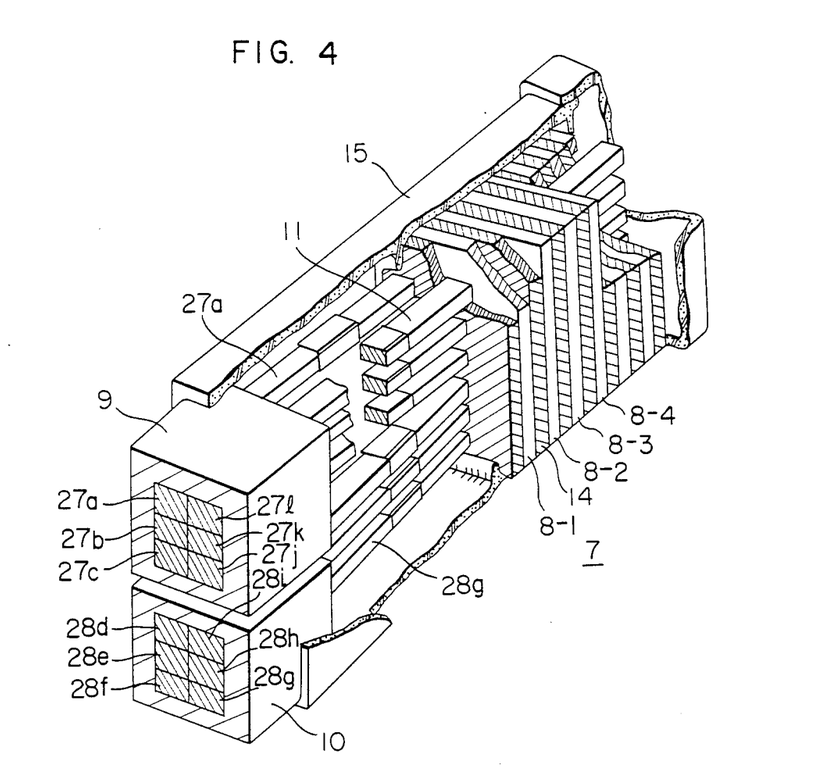
FIG. 4 is a perspective view, partly sectioned and exploded, of the apparatus of the invention.

In FIG. 4 showing a perspective view of the connecting apparatus 7, a plurality of electrically conductive plates 8-1, 8-2, 8-3, ... are provided each for electrically connecting a pair of strands together, that is, connecting one of the six strands constituting the upper conductor 9 with one of the six strands constituting the lower conductor 10. The number of the conductive plates 8 is equal to the number of the strand pairs. In this embodiment, there are provided six conductive plates for six strand pairs. The connecting apparatus 7 further comprises a plurality of insulating plates 14 interposed between the conductive plates 8, a plurality of electrically conductive connector rods 11 covered with an insulating material and electrically connected at their respective ends to the strands of the upper and lower conductors, respectively, and a guide casing 15 having the above-mentioned components therein.

Figure 5:
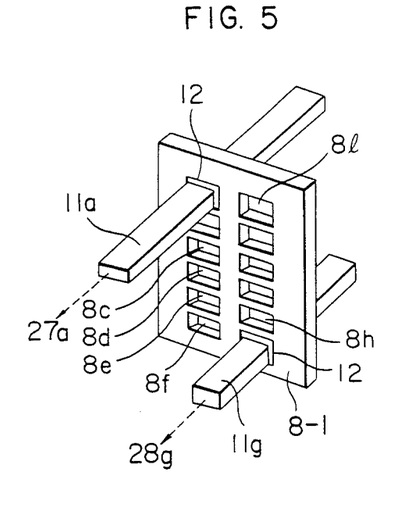
FIGS. 5 and 6 are perspective views showing different embodiments of electrically conductive plates according to the invention.
Figure 7:
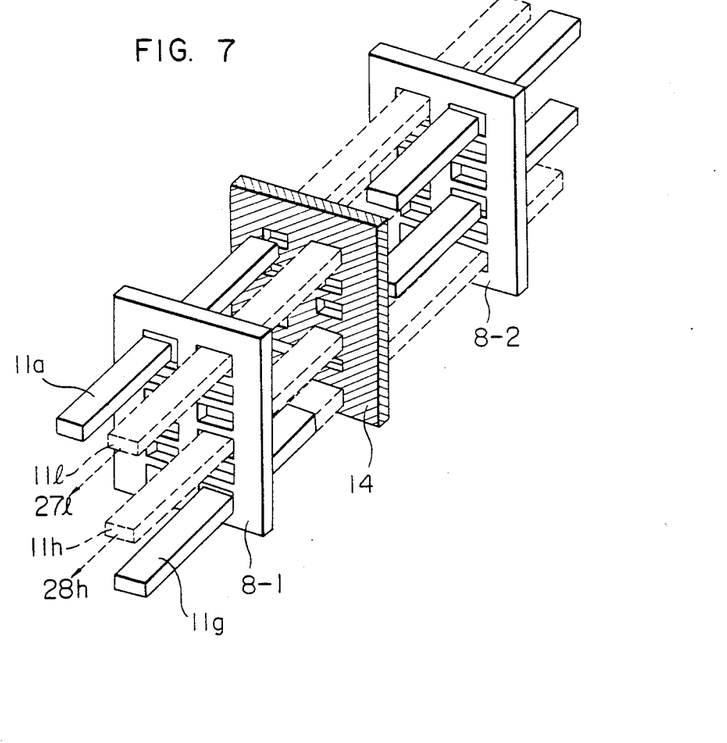
FIG. 7 is a perspective view developed to illustrate assembling of parts shown in the apparatus of FIG. 4.

As shown in FIG. 5, in each of the conductive and insulating plates, there are formed a plurality of perforations 8a to 8l corresponding in number to the strands of the upper and lower conductors and each having a size which is slightly larger than the size of the conductive connector rod. The perforations of each plate are aligned with the corresponding perforations of other plates when the conductive and insulating plates are mounted parallel with a predetermined positional relationship with each other so that the connector rods 11 are mounted by passing through the corresponding perforations of the respective plates as shown in FIGS. 4 and 7. Each conductor plate is used to electrically connect a selected one of the strands 27 of the upper conductor 9 with a selected one of the strands 28 of the lower conductor 10. For example, as shown in FIG. 5, the conductive plate 8-1 is used to connect the strands 27a of the upper conductor 9 with the strand 28g of the lower conductor 10 by partly removing the insulating covers of the connector rods 11a and 11g respectively connected to the strands 27a and 28g and bonding the exposed parts of the connector rods 11a and 11g to the conductive plate 8-1 by use of a suitable means such as silver brazing 12. Thus, the strands 27a and 28g can be electrically connected together through the conductive plate 8-1 and the conductive rods 11a and 11g. In this manner, any selected pair of the strands of the upper and lower conductors 9 and 10 can be connected together through the conductive plate 8 and hence any desired transposition of the upper and lower conductors can be readily effected by suitably selecting the pair of strands connected together through each conductor plate. As shown in FIG. 7, another pair of strands 27l and 28h are connected together through the connector rods 11l and 11h and the conductive plate 8-2, and the two conductive plates 8-1 and 8-2 are electrically insulated from each other by the intervening insulating plate 14. The insulating plate 14 also has perforations corresponding to the perforations 8a to 8l formed in the conductive plate 8. The perforations are formed in the insulating plate 14 with a shape substantially the same as the cross-section of the conductive rod so as to allow the connector rods 11a–11l to pass therethrough. These perforations and the gaps between the conductive plates 8 and the insulating plates 14 may be filled with a suitable insulating filler.

Figure 6:
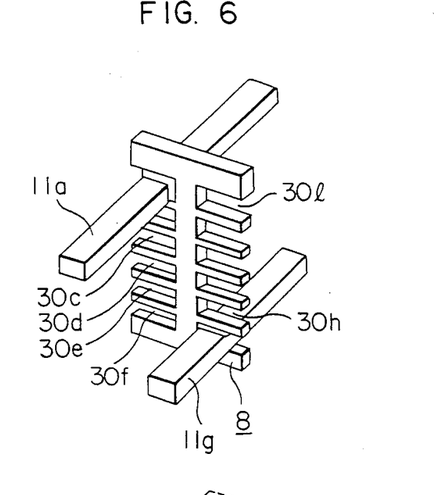

FIG. 6 shows another embodiment of the conductive plate 8 which is formed with notches 30a to 30l in place of the perforations 8a to 8l in the embodiment of FIG. 5.

Figure 8:
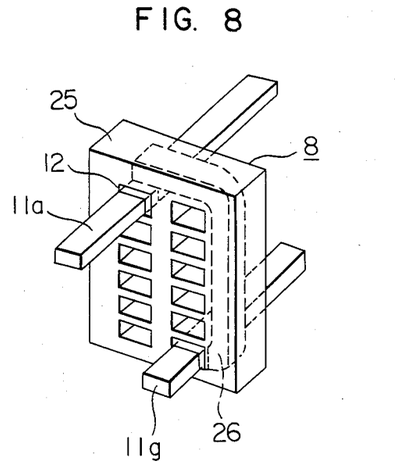
FIG. 8 is a perspective view of another embodiment of the electrically conductive plate according to the invention.
Figure 9:
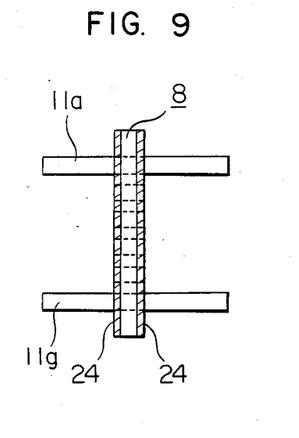
FIG. 9 is a side view of still another embodiment of the electrically conductive plate according to the invention.

Still another embodiment of the conductive plate is shown in FIG. 8. In this embodiment, a conductive member 26 is embedded in an insulating plate and conductive rods 11a and 11g are connected together through the conductive member 26. The composite electrically conductive plate 8 of this embodiment is advantageous in that the separate insulating plate 14, as interposed in the embodiment of FIGS. 4 and 7 between the conductive plates, can be eliminated. Shown in FIG. 9 is still another embodiment of the conductive plate 8 wherein each conductive plate 8 of FIG. 5 is covered with insulating films 24 at both surfaces thereof on which another conductive plate is stacked. This embodiment is advantageous like the composite conductive plate of FIG. 8, in that it can eliminate the interposition of the separate insulating plate 14 between each pair of the conductive plates.

A plurality of conductive plates 8 or composite conductive plates 8 in the foregoing embodiments are stacked in the longitudinal direction of the conductive rods 11 such that the opposite major surfaces of each conductive plate are substantially orthogonal to the longitudinal direction of the rods. Preferably, each conductive plate 8 has paths through which the conductive rods 11a to 11l to be connected with the respective strands 27 and 28 of the upper and lower conductors are extending. Therefore, by utilizing the conductive plates, the connection between each pair of strands can be readily performed in any combination of selected pairs of the strands. Further, by forming all the conductive plates 8 into the same configuration, the cost in manufacturing the conductive plates is greatly reduced.

Figure 10:
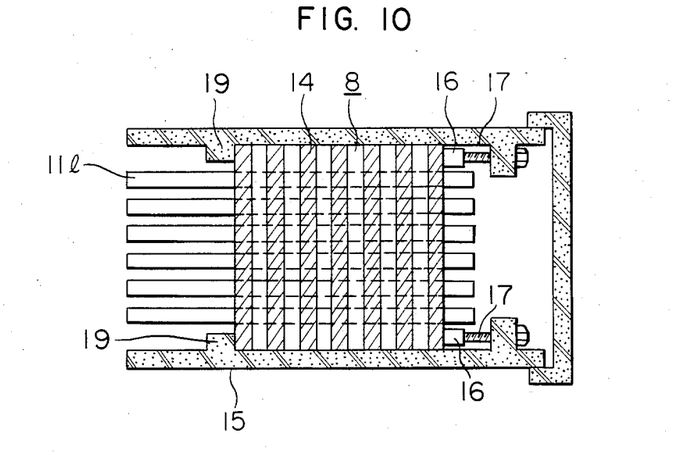
FIG. 10 is a fragmentary sectional view showing part of the apparatus of FIG. 4.

An assembly of the conductive plates 8 of the foregoing embodiments will now be exemplified with reference to FIG. 10.

Particularly, the structure shown in FIG. 10 is suitable for fixing the conductive plates 8 and insulating plates 14 in the embodiment of FIGS. 5 and 7. The same number of conductive plates 8 as the strand pairs to be connected together are laterally arrayed within the guide casing 15 with interposition of the insulating plates 14 in spaces between respective adjoining conductive plates. By tightening bolts 17 to push metal blocks 16 together with the stacked conductive plates and the insulating plates against the shoulders 19 formed to the inner wall of the guide casing 15, the conductive plate array can be compressed in the direction of stack and securely fixed.

Figure 11:
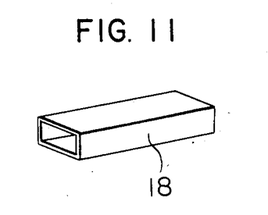
FIG. 11 is a perspective view of a coupler sleeve.
Figure 12:
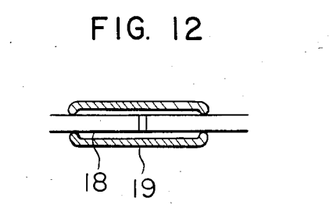
FIG. 12 is a sectional view showing a connection between an electrially conductive connector rod and a strand.

The strands 27 and 28 of the upper and lower conductors 9 and 10 can be connected to the conductive rods 11 in a manner as will be described below. Firstly, insulating covers of the strand and conductive rod and partly removed at their opposing end portions, and the bared opposing portions are mated and coupled with each other by means of a coupler sleeve 18 as shown in FIG. 11. Thereafter, this connected parts are covered with an insulating material 19 for electrical insulating the parts from other strands, as shown in FIG. 12.

In this manner, any pair of strands selected from the upper and lower conductors 9 and 10, respectively, can be connected together. Practically, if it is not sure that circulating currents flow through the strands of the armature winding are small and the loss is small by the transposition connection of the strands by using the connecting apparatus 7 of the invention, it is possible, prior to fixing connections of strands 27 and 28 with the conductive rods 11 by means of the coupler sleeves 18, to check the circulating currents and the loss and, if they are large, change the order of arrangement of the conductive plate array in this connecting apparatus or substituting the apparatus by another one having a different order in arrangement of the conductive plates thereby improving the effects of transposition of the strands of the armature winding so as to reduce the loss in the winding and to provide an optimum transposition condition.

Figure 13:
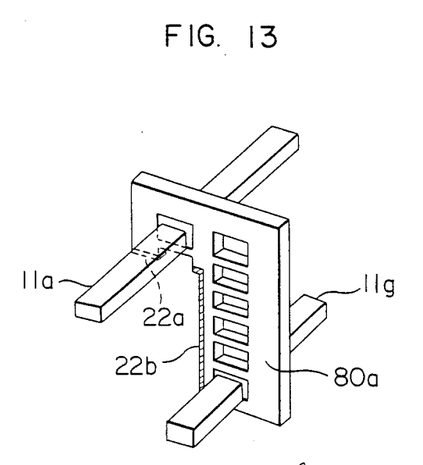
FIGS. 13 to 15 are perspective views of further embodiments of the electrically conductive plate according to the invention.
Figure 14:
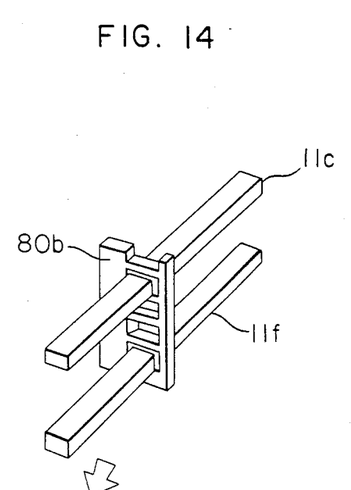
Figure 15:
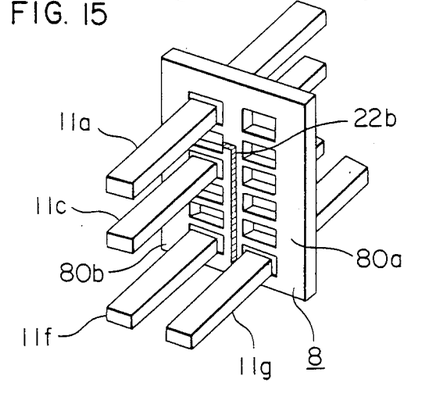

Referring to FIGS. 13 to 15, a further embodiment of the conductive plate 8 will be described.

In this embodiment, a single conductive plate 8 as shown in FIG. 15 is formed by combining a conductive sub-plate 80a as shown in FIG. 13 and another conductive sub-plate 80b as shown in FIG. 14. In other words, a conductive plate 8 shown in FIG. 5 is divided into two sub-plates shown in FIGS. 13 and 14 and these sub-plates are combined with insulating materials 22a and 22b interposed between the two sub-plates to form a unitary conductive plate shown in FIG. 15. This division is effective to provide two independent connections of two pairs of strands through rod pairs 11a, 11g and 11c, 11f wherein one pair of rods 11a and 11g are electrically connected together and the other pair of rods 11c and 11f are also electrically connected together while the two pairs of rods are electrically insulated from each other. In an alternative, a single conductive plate may be divided into three sub-plates. The unitary conductive plate 8 having sub-plates can in effect reduce the axial length of the guide casing 15 shown in FIG. 10. The teaching of this division type conductive plate 8 may also be applied to the composite conductive plate of FIG. 8.

Figure 16:
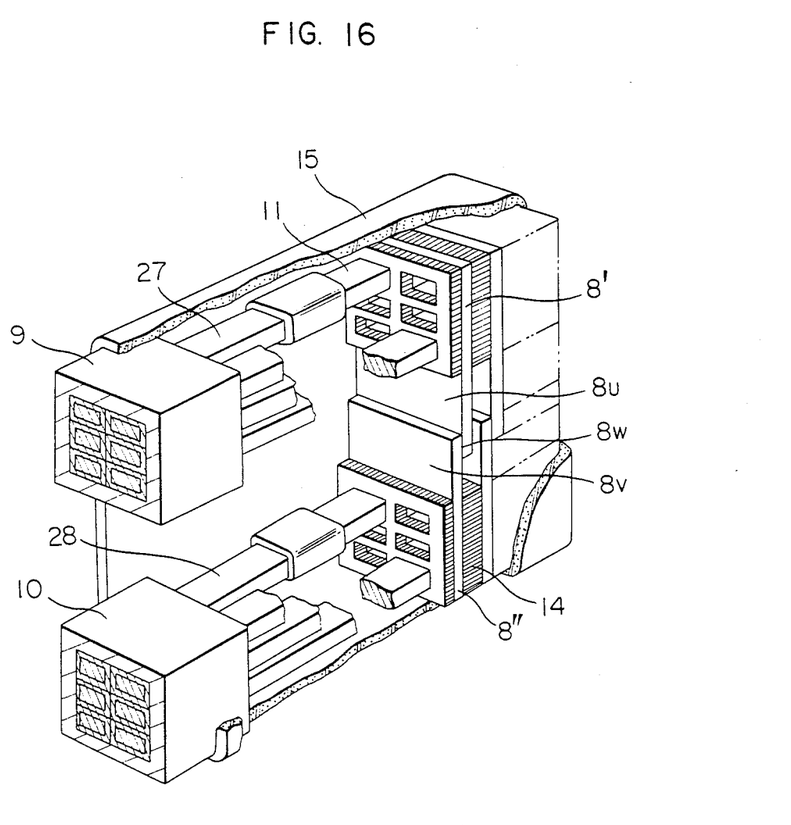
FIGS. 16 and 17 are perspective views showing further embodiments of the connecting apparatus according to the invention.

While in the foregoing embodiments the strands 27 and 28 of the upper and lower conductors 9 and 10 are connected together through a single conductive plate, two separate conductive plates 8' and 8" may be dedicated to the upper and lower conductors 9 and 10, respectively, and these separate plates may be connected together, as shown in FIG. 16.

A further embodiment to this effect will be described in greater detail with reference to FIG. 16. A conductive plate 8' connected to the strand 27 of the upper conductor 9 has a portion 8U projecting toward the lower conductor 10, and a conductive plate 8" connected to the lower conductor 10 has a portion 8V projecting toward the upper conductor. The projections 8U and 8V of conductive plates 8' and 8" for the upper and lower conductors are electrically connected together at a connection 8W. Thus, in this embodiment, one conductive plate dedicated to the upper conductor and the other conductive plate dedicated to the lower conductor are arranged by taking into consideration a selected pair of strands selected from the upper and lower conductors, respectively, to be connected together and the two separate conductive plates are finally connected together, thus attaining the effects intended by the invention.

Figure 17:
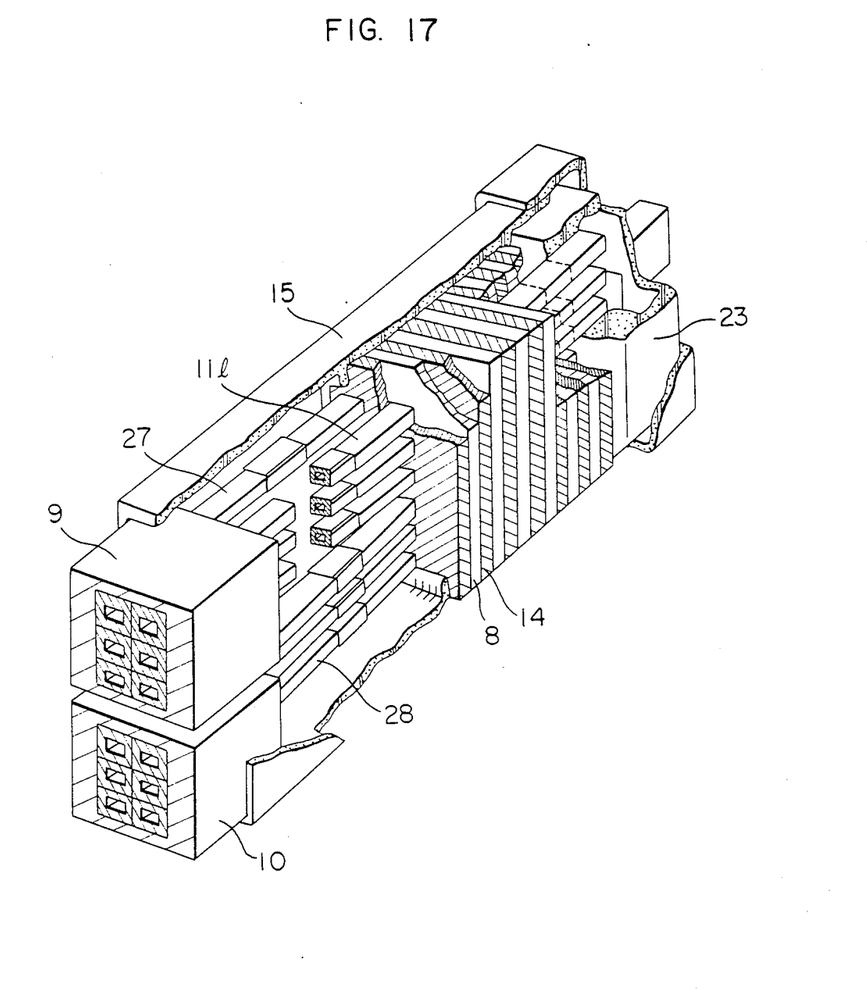

The armature winding conductors typically exemplified in FIG. 4 are cooled with air. In a liquid cooling type armature winding as shown in FIG. 17, hollow strands 27 and 28 and hollow conductive rods 11 are used, having conduits therein through which a fluid coolant is passed. To this end, a fluid communicator 23 for in-flow and out-flow of the fluid coolant flow in the conduits is attached to an axial end of the connecting apparatus 7. This fluid communicator 23 is made of an insulating material for avoidance of electrical short-circuiting between the conductive rods. Excepting this difference, this embodiment is structurally the same as the foregoing embodiment of FIG. 4.

The foregoing embodiments have been described by way of a transposition of the type in which strands of the multiple-strand conductors constituting the armature winding are transposed within the stator slots but teachings of the present invention may be applied to a rotary machine of small capacity which does not always require a transposition of conductors within the stator slots.

As described above, the apparatus for connecting conductor strands with transposition, according to the invention, is connected to an end of each of the multiple-strand conductors and uses the conductive plates for mutual connection of respective pairs of strands of the upper and lower conductors while electrically insulating the strand pair from other strand pairs. Consequently, the mutual electrical connection of any desired pair of strands is facilitated and the circulating current is reduced satisfactorily to minimize the loss in the armature winding.

We claim:

1. In an electrical rotary machine having a winding of multiple-strand conductors, an apparatus for connecting conductor strands with transposition, comprising a plurality of electrically conductive connector rods respectively connected to ends of the individual strands of the conductors, a plurality of electrically conductive plates arrayed face-to-face in a longitudinal direction of said connector rods, each plate having passages through which said connector rods extend across the plate, and means for electrically connecting a selected pair of the connector rods to a selected one of said plates at its passages through which said paired rods extend, while insulating said paired rods from other connector rods.

2. An apparatus according to claim 1, wherein said passages are perforations formed in the plate.

3. An apparatus according to claim 1, wherein at least one of said conductive plates comprises a plurality of sub-plates which are mutually connected at edges thereof with electrical insulating material interposed therebetween, and one of said sub-plates is electrically connected to a selected pair of the connector rods at its passages through which said paired rods extend, while another one of said sub-plates is electrically connected to another selected pair of the connector rods at its passages through which said another paired connector rods extend.

4. An apparatus according to claim 1, wherein said strands and connector rods are made hollow to provide passages for cooling fluid, and means being provided adjacent ends of said connector rods and communicated with the fluid-passages of said connector rods for receiving and supplying the cooling fluid to the passages.

* * * * *